(12) United States Patent
Zhang et al.

(10) Patent No.: US 11,606,574 B2
(45) Date of Patent: Mar. 14, 2023

(54) EFFICIENT CODING OF SOURCE VIDEO SEQUENCES PARTITIONED INTO TILES

(71) Applicant: Apple Inc., Cupertino, CA (US)

(72) Inventors: Dazhong Zhang, Milpitas, CA (US); Peikang Song, San Jose, CA (US); Beibei Wang, Cupertino, CA (US); Giribalan Gopalan, Cupertino, CA (US); Albert E. Keinath, Sunnyvale, CA (US); Christopher M. Garrido, Cupertino, CA (US); David R. Conrad, Sunnyvale, CA (US); Hsi-Jung Wu, San Jose, CA (US); Ming Jin, Cupertino, CA (US); Hang Yuan, San Jose, CA (US); Xiaohua Yang, San Jose, CA (US); Xiaosong Zhou, Campbell, CA (US); Vikrant Kasarabada, Cupertino, CA (US); Davide Concion, San Jose, CA (US); Eric L. Chien, Cupertino, CA (US); Bess C. Chan, Cupertino, CA (US); Karthick Santhanam, Cupertino, CA (US); Gurtej Singh Chandok, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/882,819

(22) Filed: May 26, 2020

(65) Prior Publication Data
US 2020/0382806 A1  Dec. 3, 2020

Related U.S. Application Data

(60) Provisional application No. 62/855,552, filed on May 31, 2019.

(51) Int. Cl.
*H04N 19/507* (2014.01)
*H04N 19/65* (2014.01)

(52) U.S. Cl.
CPC .......... *H04N 19/507* (2014.11); *H04N 19/65* (2014.11)

(58) Field of Classification Search
CPC .. H04N 19/174; H04N 19/176; H04N 19/177; H04N 19/172; H04N 19/17;
(Continued)

(56) References Cited

U.S. PATENT DOCUMENTS 5,398,078 A * 3/1995 Masuda ............... H04N 19/176
348/699
5,565,920 A * 10/1996 Lee ..................... H04N 19/503
348/699

(Continued)

*Primary Examiner* — Nathnael Aynalem
(74) *Attorney, Agent, or Firm* — BakerHostetler

(57) ABSTRACT

Techniques are disclosed for coding video data in which frames from a video source are partitioned into a plurality of tiles of common size, and the tiles are coded as a virtual video sequence according to motion-compensated prediction, each tile treated as having respective temporal location of the virtual video sequence. The coding scheme permits relative allocation of coding resources to tiles that are likely to have greater significance in a video coding session, which may lead to certain tiles that have low complexity or low motion content to be skipped during coding of the tiles for select source frames. Moreover, coding of the tiles may be ordered to achieve low coding latencies during a coding session.

11 Claims, 7 Drawing Sheets

(58) Field of Classification Search
CPC .... H04N 19/503; H04N 19/51; H04N 19/513;
H04N 19/517; H04N 19/52; H04N
19/521; H04N 19/537; H04N 19/54;
H04N 19/543
USPC ........................................ 375/240.01–240.29
See application file for complete search history.

(56) References Cited

U.S. PATENT DOCUMENTS

| | | | | |
|---|---|---|---|---|
| 6,057,893 | A * | 5/2000 | Kojima | H04N 5/147 |
| | | | | 348/699 |
| 6,480,537 | B1 * | 11/2002 | Agrawal | H04N 21/235 |
| | | | | 375/240 |
| 8,019,167 | B2 * | 9/2011 | Dvir | H04N 19/187 |
| | | | | 382/232 |
| 2005/0237380 | A1 * | 10/2005 | Kakii | H04N 7/147 |
| | | | | 348/14.12 |
| 2007/0183661 | A1 * | 8/2007 | El-Maleh | G06T 7/174 |
| | | | | 382/173 |
| 2014/0079126 | A1 * | 3/2014 | Ye | H04N 19/593 |
| | | | | 375/240.16 |
| 2016/0360231 | A1 * | 12/2016 | Yuan | H04N 19/88 |
| 2017/0280155 | A1 * | 9/2017 | Iwata | H04N 19/174 |
| 2018/0343448 | A1 * | 11/2018 | Possos | H04N 19/117 |
| 2018/0352221 | A1 * | 12/2018 | Lee | H04N 19/159 |
| 2019/0342581 | A1 * | 11/2019 | Deshpande | H04N 19/109 |
| 2020/0092571 | A1 * | 3/2020 | Tourapis | G09G 5/14 |
| 2020/0177927 | A1 * | 6/2020 | Yang | H04N 21/6587 |
| 2020/0302658 | A1 * | 9/2020 | Simon | H04N 19/88 |
| 2021/0274176 | A1 * | 9/2021 | Kang | H04N 19/119 |

\* cited by examiner

100

200

300

400

500

600

700

800

900

1000

1100

1200

1300

1400

1500

EFFICIENT CODING OF SOURCE VIDEO SEQUENCES PARTITIONED INTO TILES

CROSS REFERENCE TO RELATED APPLICATION

This application claims the benefit of U.S. Provisional Application No. 62/855,552 filed on May 31, 2019, the disclosure of which is incorporated by reference herein.

BACKGROUND

The present disclosure relates to video coding and decoding techniques and, in particular, to techniques for coding video with increased bandwidth compression.

Modern video coding standards provide techniques for encoding a series of video frames with bandwidth compression. Typically, a frame content is predicted from a previously-coded frame using "temporal prediction." A frame may be encoded as multiple slices, which partition the frame content into sub-regions, namely "slices." Such coding protocols tend to be inefficient because even if only a small region of a frame content changes on a frame-to-frame basis, prevailing standards require an entire frame to be differentially coded, including all slices that are defined therein.

DETAILED DESCRIPTION

Aspects of the present disclosure provide techniques for coding video data in which frames from a video source may be partitioned into a plurality of tiles of common size. The tiles may be coded as a virtual video sequence according to motion-compensated prediction, where each tile may be treated as having respective temporal location of the virtual video sequence. The disclosed coding schemes permit relative allocation of coding resources to tiles that are likely to have greater significance in a video coding session, which may lead to certain tiles that have low complexity or low motion content to be skipped during coding of the tiles in selected source frames. Moreover, coding of the tiles may be ordered to achieve low coding latencies during a coding session.

Figure 1:
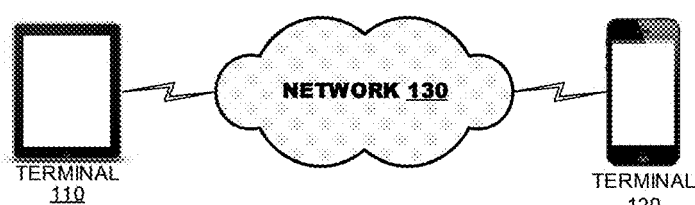
FIG. 1 illustrates a video exchange system 100 according to an aspect of the present disclosure.

FIG. 1 illustrates a video exchange system 100 according to an aspect of the present disclosure. The system 100 may include two or more terminals 110, 120 that may exchange video data across a communication network 130. Video data generated at a first terminal 110 may be compressed according to video coding processes which reduce the video's bandwidth and may be transmitted to other terminal(s) 120 for decoding and consumption. In the simplified diagram illustrated in FIG. 1, a first terminal 110 may send the video to a second terminal 120. In other applications, however, the first terminal 110 may send the video to multiple terminals (not shown) for consumption in parallel. Moreover, other applications may involve multidirectional exchange of video where, for example, the second terminal 120 may generate its own video data, compress it, and send it to the first terminal 110 for consumption. The principles of the present discussion find application in all such use cases.

In the example of FIG. 1, the terminals 110, 120 are illustrated as tablet computers and smartphones, respectively. The principles of the present disclosure may find applications for a diverse array of terminal devices, including for example, computer services, personal computers, desktop computer, laptop computers, personal media devices, set top devices, and media players. The type of terminal device is immaterial to the present discussion unless noted otherwise herein.

Moreover, the principles of the present disclosure may find applications with a wide variety of networks 130. Such networks 130 may include packet-switched and circuit-switched networks, wired and wireless networks, and computer and communications networks. The architecture and topology of the network 130 is immaterial to the present discussion unless noted otherwise herein.

Figure 2:
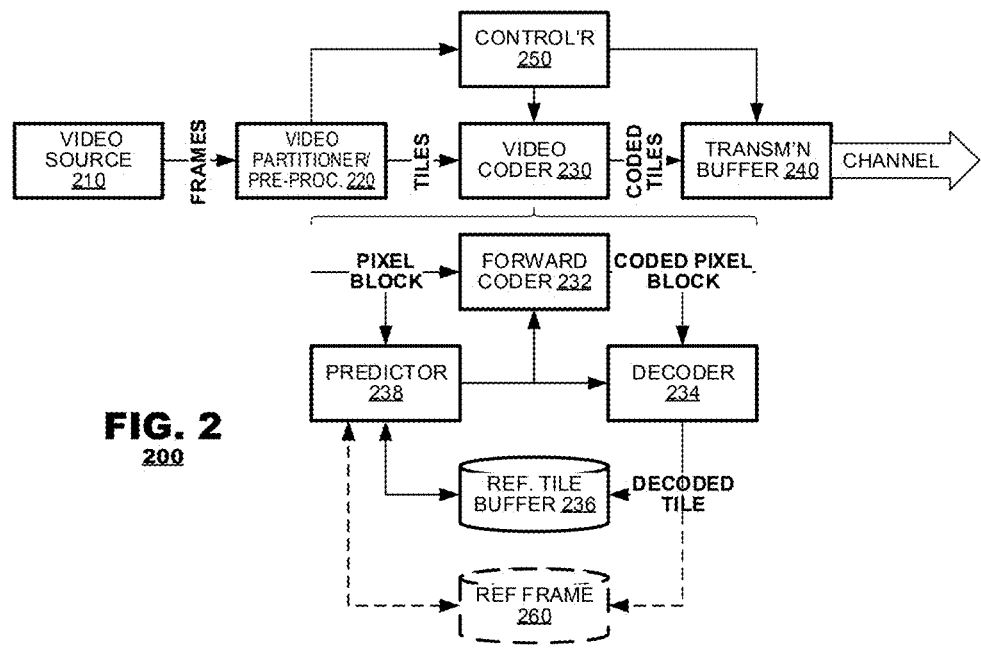
FIG. 2 is a functional block diagram of an encoding terminal according to an aspect of the present disclosure.

FIG. 2 is a functional block diagram of an encoding system 200 according to an aspect of the present disclosure. The encoding system 200 may be part of a terminal in FIG. 1 and may carry out the coding of video data for transmission to another terminal, such as the terminals 110, 120. The encoding system 200 may include a video source 210, a video partitioner 220, a video coder 230, a transmission buffer 240, and a controller 250. The video source 210 may generate video data that is to be coded and transmitted to other terminal(s) (FIG. 1). The video partitioner 220 may partition frames into sub-regions, called "tiles" for convenience, for coding by the video coder 230. The video coder 230 may apply video compression operations on the video data of the tiles which achieve bandwidth compression. The transmission buffer 240 may format the coded tile data according to a syntax of a governing coding protocol and prepare it for transmission in a communication channel. Channel data generated by the transmission buffer may be transmitted from the terminal 200 to another terminal device 120 (FIG. 1).

The video coder 230 may be a predictive video coder, which achieves bandwidth compression by exploiting temporal and/or spatial redundancy in the image data of the tiles. The video coder 230 may include a forward coder 232, a decoder 234, a reference tile buffer 236, and a predictor 238. The forward coder 232 may code input data of the tiles, which have been partitioned further into smaller regions called "pixel blocks," differentially with respect to prediction data supplied by the predictor 238. The coded data of the tile's pixel blocks may be output from the video coder 230 and input also to the decoder 234.

The decoder 234 may generate decoded video from the coded pixel block data of certain tiles that are designated "reference tiles." These reference tiles may serve as candidates for prediction of other tiles that are processed later by the video coder 230. The decoder 234 may decode the coded pixel block by inverting coding operations that were applied by the forward coder 232. Coding operations of the forward coder 232 typically incur coding losses so the decoded video obtained by the decoder 234 often will resemble the image data input to the forward coder 232 but it will exhibit some loss of information. When a reference tile is completely decoded, the tile data may be stored in the reference tile buffer 236.

The predictor 238 may perform prediction searches between newly received pixel block data and reference tile data stored in the reference tile buffer 236. When the predictor 238 identifies a match, the predictor 238 may supply pixel block data from a matching tile to the forward coder 232 and the decoder 234 for use in predictive coding and decoding.

Figure 3:
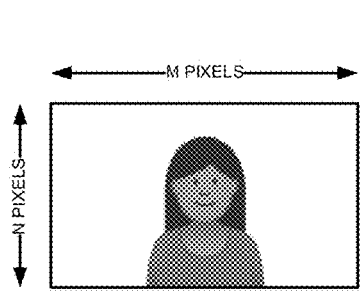
FIG. 3 illustrates an exemplary source frame that may be partitioned according to aspects of the present disclosure.
Figure 4:
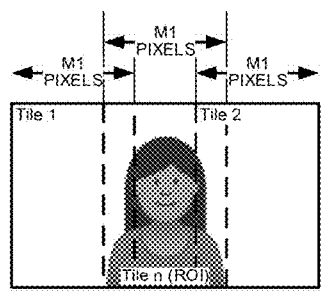
FIG. 4 illustrates the source frame of FIG. 3 partitioned according to an exemplary set of tiles.
Figure 5:
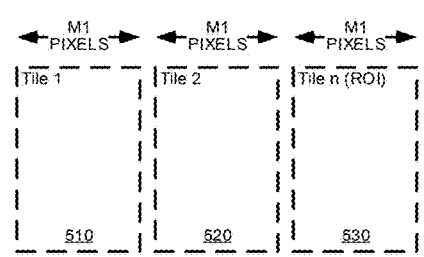
FIG. 5 illustrates the exemplary tiles of FIG. 4.

FIGS. 3-5 illustrate an exemplary partitioning scheme. FIG. 3 illustrates an input frame 300 which has dimensions M×N pixels. The input frame 300 may be partitioned into a plurality of tiles (e.g., the three tiles that are shown in this example) each having the same sizes. In the example of FIG. 4, the input frame 300 is shown to be partitioned into three tiles having dimensions M1×N pixels. The tiles spatially overlap each other in this example. FIG. 5 illustrates the three tiles 510-530 as they may be input into the video coder 230 (FIG. 2).

Figure 6:
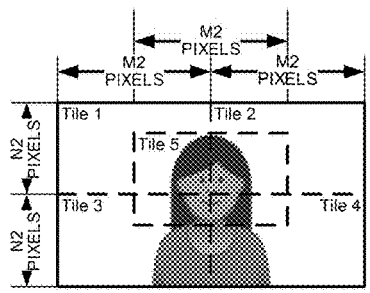
FIG. 6 illustrates the source frame of FIG. 3 partitioned according to another exemplary set of tiles.
Figure 7:
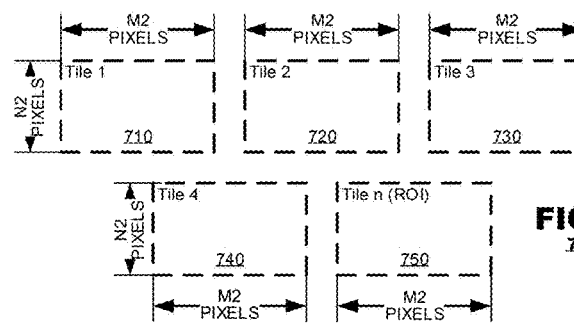
FIG. 7 illustrates the exemplary tiles of FIG. 6.

In practice, a video partitioner 220 (FIG. 2) need not partition an input frame using tiles that extend the full length of an input frame in either the vertical direction (as shown in FIG. 4) or the horizontal direction of an input frame 300. FIGS. 6 & 7 illustrate an alternative partitioning scheme that may be applied to an input frame 300, where the input frame is partitioned into five tiles of M2×N2 pixels.

A video partitioner 220 may employ a variety of techniques to select the size and locations of tiles. In one aspect, the video partitioner 220 may work cooperatively with object detection processes to identify likely regions of interest ("ROIs") in the video content, then select tile sizes based on the size(s) of the ROIs. Many video coding algorithms employ face detection techniques, body detection techniques, and other detection techniques for predetermined types of objects in the video content. When such objects are detected in the video, the objects typically represent an area of focus for human viewers. A video partitioner 220 may estimate sizes of ROIs that are detected in video, then select a tile size according, for example, to the largest-sized ROIs observed in the video. Moreover, the video partitioner may define tiles to enclose the ROI(s) detected in the video content, and then use the defined tile size to partition the remainder of the frame. The example of FIGS. 6 and 7 illustrate tile sizes that may be defined based on ROIs.

In another aspect, a video partitioner 220 may analyze motion of image content within video. The video partitioner 220 may identify region(s) of image content that exhibit directional motion that is inconsistent with general direction of motion of other image content. Such techniques may be useful to identify foreground content that moves against background content within video. The partitioner 220, first, may estimate motion of partition(s) within image content (for example, pixel blocks discussed herein), and may then identify patterns among the estimated pixel block motions. A general level of motion of the frame content may be estimated from motion of pixel blocks across frame images, estimating the background motion. Foreground content may be estimated from motion of pixel blocks that are inconsistent with such background motion. A partitioner 220 may assign ROIs to adjacent pixel blocks when they exhibit generally consistent motion to each other and have motion inconsistent with pixel blocks estimated to be part of a background.

Tile partitioning may be performed so that each tile $T_1$-$T_n$ of a frame has a common size. Doing so permits the tiling features of the present disclosure to work cooperatively with common video coding standards such as the International Telecommunication Union (ITU) H.26X coding standards (e.g., one of H.265, H.264, H.263, etc.). Thus, the video coder 230 may operate according an ITU H.26X, which does not natively support partitioning of video frames into tiles as described herein. Instead, those standards operate on a frame as a representation of video content at each temporal instant, and code those frames according to temporal and/or spatial prediction, as discussed. When processing tiles as proposed herein, a video coder 230 may assign timestamps or other temporal identifiers to each tiles, treating it as a temporally distinct "frame" according to the coder's coding protocol. The controller 250 may provide metadata in a coded channel bit stream, for example, that defines the number of tiles T1-Tn, the size of the tiles, and their locations within source frames. Accordingly, a decoder (not shown) may develop a composite frame from the tiles recovered by decoding the coded tile data according to the coding protocol and spatially arranging the recovered tile data according to the metadata. The controller 250 also may provide, for tiles that spatially overlap with other tiles within the source frame, metadata indicating relative weightings to be applied to tile data during frame reassembly. Moreover, a controller 250 may provide to the tiles timestamps or other temporal indicia to permit the video coder 230 to process the sequence of tiles as temporally-spaced frames of a video sequence.

The tile partitioning techniques of the present disclosure permit location(s) of tiles to change from frame to frame. Thus, when a foreground ROI moves from frame to frame, the tile(s) that represent the ROI (FIG. 6) may move in correspondence. A controller 250 may provide data in the coded channel bit stream representing locations of the tiles as they "move" within the source video.

When source frames are partitioned into tiles as described herein, video coders can leverage the tiles to achieve bandwidth compression. In many applications, frame content remains static on a frame-to-frame basis. For example, in a still (static) camera case, e.g., in a videoconferencing application where the camera is mounted in a fixed location, there may be little or no frame-to-frame differences among background content and only foreground content (for example, the videoconference participants) may change. In such cases, a partitioner that partitions frames into tiles according to foreground object/background content distinctions may generate a plurality of background tiles with little content variations. A video coder 230 may code those tiles with high efficiency (perhaps by SKIP-ing coding of the tiles altogether for selected source frames), thereby conserving processing resources and channel bandwidth for high-quality coding of the tiles containing the foreground objects. Such techniques may contribute to lower-bandwidth coding, which extends the applicability of video coding to a greater array of processing devices, particularly those with low bandwidth connectivity to other devices.

Figure 8:
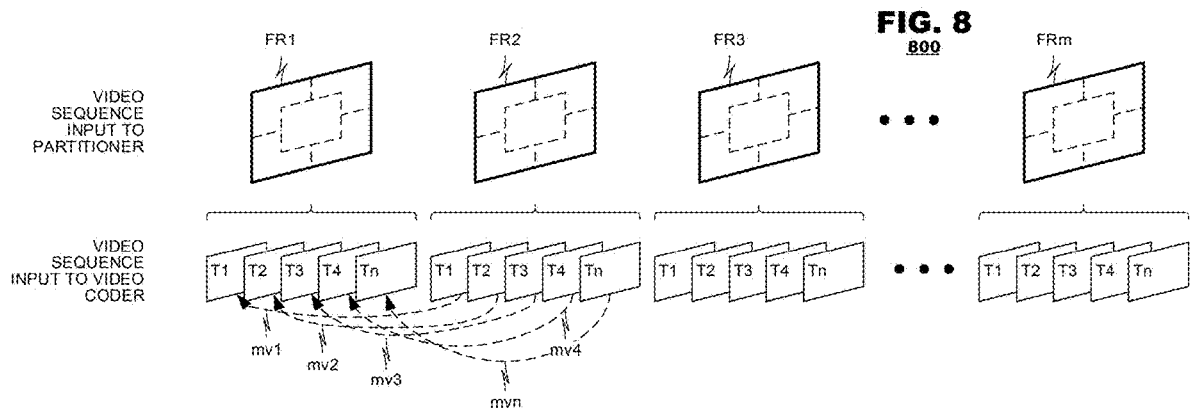
FIG. 8 illustrates exemplary prediction references for video coding, according to an aspect of the present disclosure.

FIG. 8 illustrates management of prediction references that a controller 250 may perform, according to an aspect of the present disclosure. FIG. 8 illustrates a video sequence that may be input to a partitioner 220 (FIG. 2), and tiles that may be input to a video coder 230 as in the example of FIGS. 6 and 7. In this example, a source video sequence may contain a number of video frames $FR_1$-$FR_m$, each of which is partitioned into a plurality of tiles $T_1$-$T_n$. These tiles represent the image content that are to be coded by the video coder 230; thus, from the video coder's "perspective" the video coder operates on the tiles $T_1$-$T_n$ as if they are "frames" on which the coding protocol operates.

In an aspect, the controller 250 may manage designation of tiles that serve as prediction references for use in prediction. As discussed, a video coder 230 (FIG. 2) may perform prediction searches to identify content from reference tiles that can serve as prediction references for new content that is to be processed by the video coder. The controller 250 may ensure that prediction references for each tile $T_1$-$T_n$ remain available in a reference tile buffer 236. In the example of FIG. 8, all tiles of the frame $FR_1$ may be designated as reference tiles, which causes the tiles $T_1$-$T_n$ of that frame $FR_1$ to be decoded, stored in the reference tile buffer 236 of the video coder 230, and made available for prediction of new content. The example of FIG. 8 illustrates prediction references $mv_1$-$mv_n$ for tiles $T_1$-$T_n$ of frame $FR_2$ extending to corresponding tiles $T_1$-$T_n$ of frame $FR_1$.

Although the example of FIG. 8 illustrates all tiles $T_1$-$T_n$ of a single frame FR being designated as reference tiles, other aspects of the present disclosure may permit designation of reference tiles to be performed according to other policies. For example, a controller 250 may designate tiles as prediction references based on estimate rates of change of image content within those tiles. In circumstances where some tiles contain background content that has static content over prolonged periods of time (e.g., tile $T_1$ across frames $FR_1$-$FR_m$), such tiles may be designated as reference tiles at relatively low frequencies. In contrast, in circumstances where other tiles have content with relatively high rates of change, those tiles (e.g., tile $T_n$) may be selected as reference tiles at high frequencies.

Figure 9:
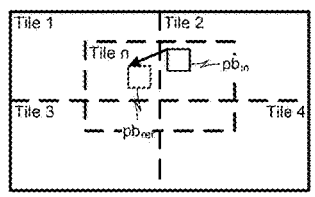
FIG. 9 illustrates an exemplary prediction reference applied to the example of FIG. 6.

Moreover, while the example of FIG. 8 illustrates prediction references from new tiles extending only to co-located tiles, the principles of the present discussion are not so limited. Video coder prediction searches need not be limited on a tile basis, which permits prediction searches to extend across tiles' boundaries, an example of which is shown in FIG. 9. Therein, FIG. 9 illustrates an exemplary input pixel block $pb_{in}$ that is a member of a tile $T_n$ in an input frame. Tile n overlaps portions of several other tiles ($T_1$-$T_4$). In this example, based on the location of the input pixel block $pb_{in}$, prediction searches may identify matching content from tiles $T_1$, $T_2$, and/or $T_n$. FIG. 9 illustrates an example where a predicted pixel block $pb_{ref}$ is identified as available in tile $T_1$.

Many video coding protocols define search windows for prediction operations that are constrained to predetermined maximum distances from an input pixel block's location within an input frame. As is evident from the example of FIG. 9, an input pixel block's location in one tile ($pb_{in}$'s location in tile $T_n$) is markedly different from the pixel block's location in another tile (tile $T_2$). Moreover, the reference pixel block $pb_{ref}$ illustrated in tile $T_1$ is shown as taken from the right-hand side of tile $T_1$ whereas the input pixel block $pb_{in}$ is illustrated as located on the left-hand side of tile $T_2$. During prediction searches, a controller 250 (FIG. 2) may work cooperatively with a predictor 236 to define cross-tile search windows for the predictor 236 in a manner that conforms to syntax of a governing coding protocol.

In another aspect, a controller 250 (FIG. 2) may constrain video coder operations to smooth application of coding parameters across tiles $T_1$-$T_n$ of a common frame. For example, the controller 250 may cause the video coder 230 to apply certain prediction modes (intra- and inter-coding modes), quantization parameters, and/or in-loop filtering operations across tiles $T_1$-$T_n$ of a frame.

Figure 10:
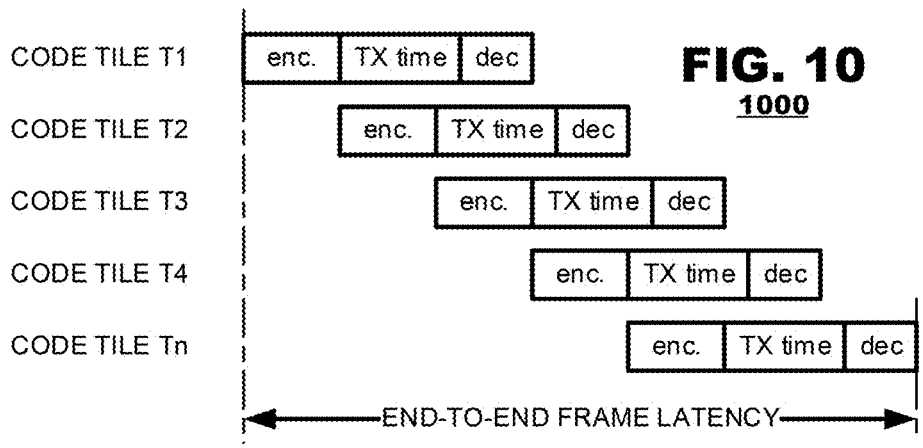
FIG. 10 illustrates an exemplary schedule of pipelined coding operations according to an aspect of the present disclosure.

It is expected that, in operation, tiles may be coded and decoded in a pipelined fashion which can minimize latency of coding and decoding operations. FIG. 10 illustrates a timeline of tile coding operations according to one aspect of the present disclosure. Therein, tile coding/decoding operations are shown for a set of tiles $T_1$-$T_n$ corresponding to a single frame. Each tile is to be coded, transmitted to a decoder, and decoded. In this simplified example, it is assumed that coding operations have a common duration for all tiles, transmission operations have a common duration, and decoding operations have a common duration. Overall the latency of coding the frame, transmission, and decoding is shown, which extends from the onset of coding for the frame's first tile $T_1$ to the conclusion of decoding for the frame's last tile $T_n$. Once a decoder decodes the final tile of a frame, the decoder has sufficient information to display the recovered frame in its entirety.

Figure 11:
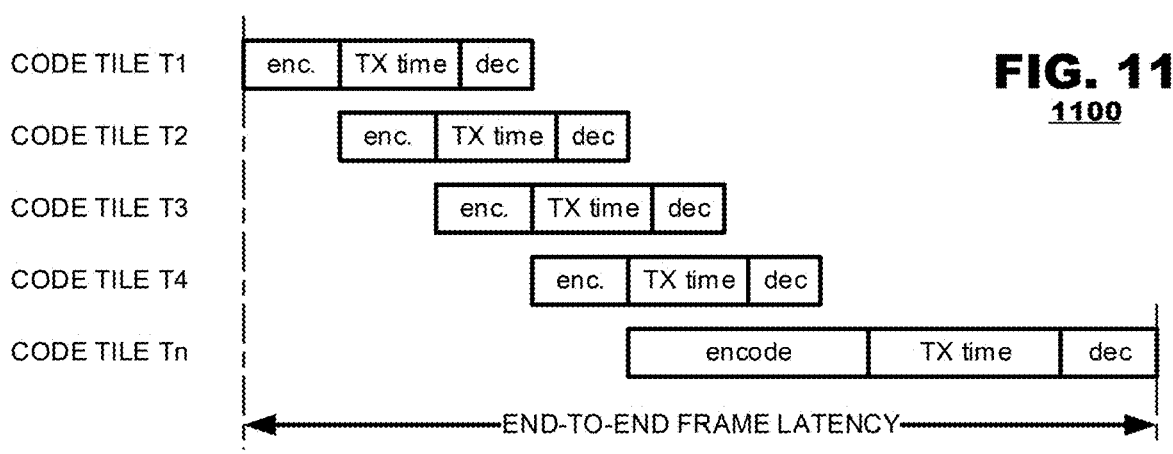
FIG. 11 illustrates another exemplary schedule of pipelined coding operations according to an aspect of the present disclosure.
Figure 12:
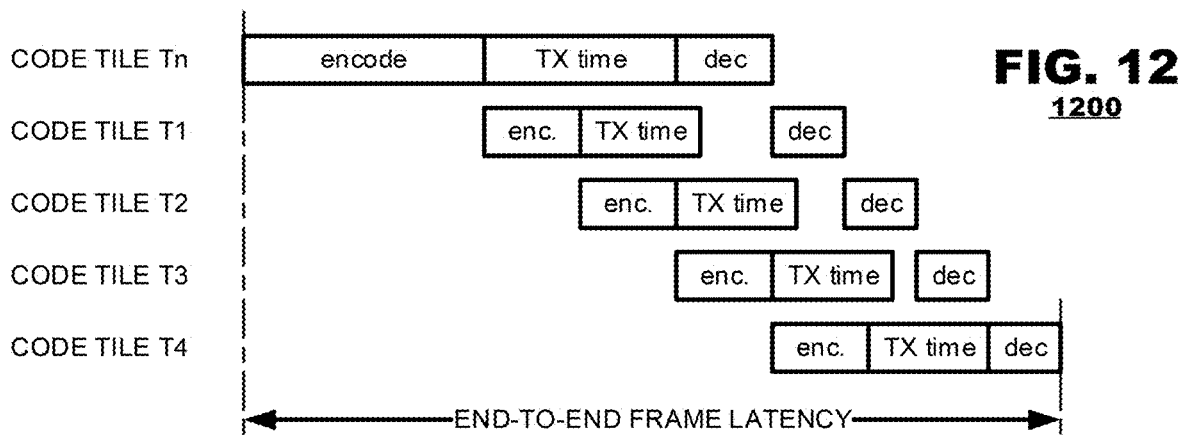
FIG. 12 illustrates a further exemplary schedule of pipelined coding operations according to an aspect of the present disclosure.

In practice, coding times, transmission times, and decoding times often are not uniform. In an aspect, a controller 250 (FIG. 2) may manage coding order of tiles $T_1$-$T_n$ from a common frame to reduce overall latency of frame coding and decoding. FIGS. 11 and 12 illustrate such techniques. In the example of FIG. 11, a tile $T_n$ of an input frame possess complex image information that, as compared to other tiles $T_1$-$T_4$, may be expensive to code in terms of the time that an encoder takes to code the data, the volume of coded data that is required to represent the tile $T_n$ and the time that a decoder takes to decode the coded tile. For simplicity, the other tiles $T_1$-$T_4$ are illustrated has having the same times for coding, data transmission and decoding.

In an aspect, a controller 250 may estimate complexity of image content in the tiles and may order the tile coding in an order that minimizes the overall coding/decoding latency. As illustrated in FIG. 12, a tile that is expensive to code may be coded earlier in the tile coding order, and transmitted to a decoder. Other tiles that are less expensive to code may be coded later in the tile coding order. In coding applications that pipeline encoding and encoding operations, such operations may reduce overall coding latency as compared to other applications (as shown in FIG. 11) where tile coding may occur in a predetermined coding order.

As discussed, an encoder need not code tiles from every source frame. When a tile is skipped or otherwise not coded, an encoder may update the tile's reference pictures with content from other tiles that overlap the skipped tile. For example, as shown in FIG. 6, tiles $T_1$-$T_4$ overlap portions of a center ROI tile $T_n$. In this example, if hypothetically content of a background tile $T_1$ were not coded from a given source frame (say, $FR_3$), content of the tile $T_1$ could be derived from overlapping portions of another tile, such as tile $T_n$.

In an aspect, a video coder 230 may include a reference frame store 260 that stores prediction data in frames at the size of the source frame. When reference tiles are decoded, they may be stored in the reference tile buffer 236 and they also may update a corresponding portion of frame data stored in the reference frame store 260.

In another aspect, tile locations can adapt from frame to frame. A controller may estimate when occlusions occur in image content and when occluded content is revealed. The controller may identify regions of content that correspond to background content and may control reference tile designations to cause background content (when revealed) to be contributed to reference frame data stored in the reference frame store 260. Moreover, signaling protocols may be employed to designate the frame data in the reference stored in a manner consistent with identification of Long Term Reference frames in modern coding protocols, which cause stored prediction data to remain resident in a prediction buffer until evicted. In such a manner, background data may be stored persistently in a reference frame buffer 260, which leads to efficient coding when formerly-occluded background content is revealed.

The use of reference frame buffers 260 may provide further advantages. Often, coding standards limit the number of reference pictures that can be stored in the reference picture buffer, which can limit the number of tiles that can be stored for prediction references. A reference frame buffer 260 may provide an alternate storage scheme, which may relieve coding systems from such limitations.

Figure 13:
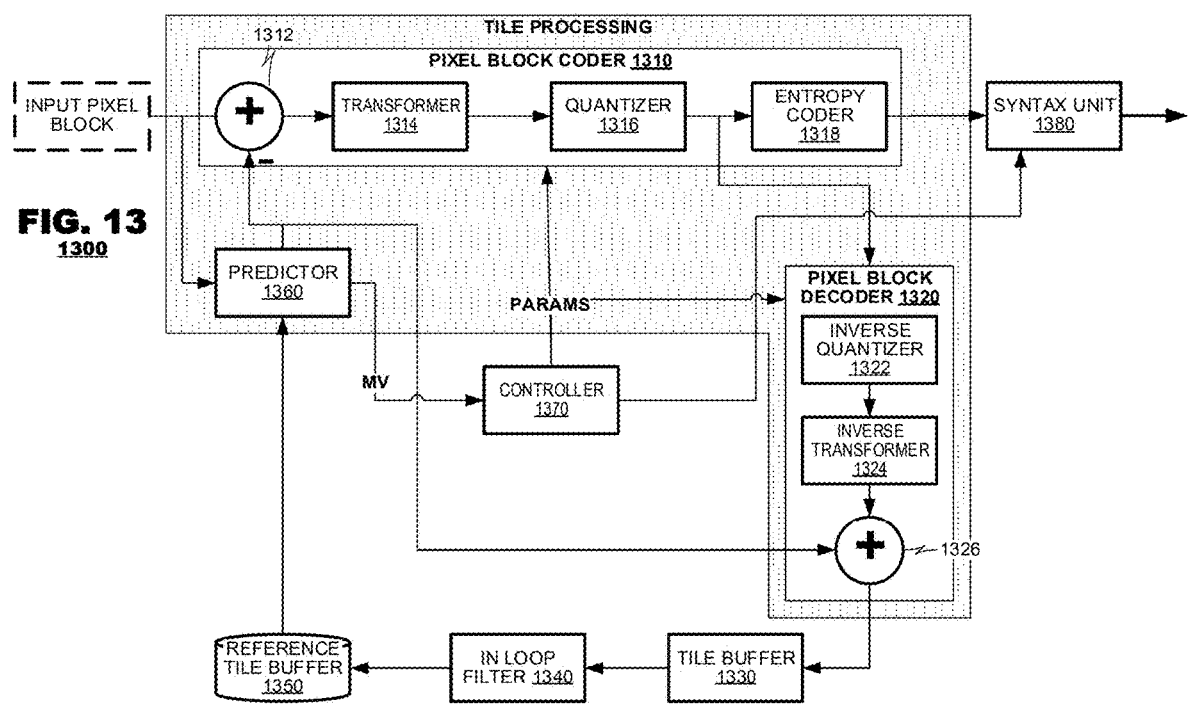
FIG. 13 is a block diagram of a video coder according to an aspect of the present disclosure.

FIG. 13 is a functional block diagram of a video coder 1300 according to an aspect of the present disclosure. The video coder 1300 may operate as the video coder 230 of FIG. 2. The system 1300 may include a pixel block coder 1310, a pixel block decoder 1320, a tile buffer 1330, an in-loop filter system 1340, a reference tile buffer 1350, a predictor 1360, a controller 1370, and a syntax unit 1380.

The pixel block coder 1310 and the predictor 1360 may receive data of an input pixel block. The predictor 1360 may generate prediction data for the input pixel block and input it to the pixel block coder 1310. The pixel block coder 1310 may code the input pixel block differentially with respect to the predicted pixel block output coded pixel block data to the syntax unit 1380. The pixel block decoder 1320 may decode the coded pixel block data, also using the predicted pixel block data from the predictor 1360, and may generate decoded pixel block data therefrom.

The tile buffer 1330 may generate reconstructed tile data from decoded pixel block data. The in-loop filter 1340 may perform one or more filtering operations on the reconstructed tile. For example, the in-loop filter 1340 may perform deblocking filtering, sample adaptive offset (SAO) filtering, adaptive loop filtering (ALF), maximum likelihood (ML) based filtering schemes, deringing, debanding, sharpening, resolution scaling, and the like. The reference tile buffer 1350 may store the filtered tile, where it may be used as a source of prediction of later-received pixel blocks. The syntax unit 1380 may assemble a data stream from the coded pixel block data, which conforms to a governing coding protocol.

The pixel block coder 1310 may include a subtractor 1312, a transform unit 1314, a quantizer 1316, and an entropy coder 1318. The pixel block coder 1310 may accept pixel blocks of input data at the subtractor 1312. The subtractor 1312 may receive predicted pixel blocks from the predictor 1360 and generate an array of pixel residuals therefrom representing a difference between the input pixel block and the predicted pixel block. The transform unit 1314 may apply a transform to the sample data output from the subtractor 1312, to convert data from the pixel domain to a domain of transform coefficients. The quantizer 1316 may perform quantization of transform coefficients output by the transform unit 1314. The quantizer 1316 may be a uniform or a non-uniform quantizer. The entropy coder 1318 may reduce bandwidth of the output of the coefficient quantizer by coding the output, for example, by variable length code words or using a context adaptive binary arithmetic coder.

The transform unit 1314 may operate in a variety of transform modes as determined by the controller 1370. For example, the transform unit 1314 may apply a discrete cosine transform (DCT), a discrete sine transform (DST), a Walsh-Hadamard transform, a Haar transform, a Daubechies wavelet transform, or the like. In an aspect, the controller 1370 may select a coding mode M to be applied by the transform unit 1315, may configure the transform unit 1315 accordingly and may signal the coding mode M in the coded video data, either expressly or impliedly.

The quantizer 1316 may operate according to a quantization parameter $Q_P$ that is supplied by the controller 1370. In an aspect, the quantization parameter $Q_P$ may be applied to the transform coefficients as a multi-value quantization parameter, which may vary, for example, across different coefficient locations within a transform-domain pixel block. Thus, the quantization parameter $Q_P$ may be provided as a quantization parameters array.

The entropy coder 1318, as its name implies, may perform entropy coding of data output from the quantizer 1316. For example, the entropy coder 1318 may perform run length coding, Huffman coding, Golomb coding, Context Adaptive Binary Arithmetic Coding, and the like.

The pixel block decoder 1320 may invert coding operations of the pixel block coder 1310. For example, the pixel block decoder 1320 may include a dequantizer 1322, an inverse transform unit 1324, and an adder 1326. The pixel block decoder 1320 may take its input data from an output of the quantizer 1316. Although permissible, the pixel block decoder 1320 need not perform entropy decoding of entropy-coded data since entropy coding is a lossless event. The dequantizer 1322 may invert operations of the quantizer 1316 of the pixel block coder 1310. The dequantizer 1322 may perform uniform or non-uniform de-quantization as specified by the decoded signal $Q_P$. Similarly, the inverse transform unit 1324 may invert operations of the transform unit 1314. The dequantizer 1322 and the inverse transform unit 1324 may use the same quantization parameters $Q_P$ and transform mode M as their counterparts in the pixel block coder 1310. Quantization operations likely will truncate data in various respects and, therefore, data recovered by the dequantizer 1322 likely will possess coding errors when compared to the data presented to the quantizer 1316 in the pixel block coder 1310.

The adder 1326 may invert operations performed by the subtractor 1312. It may receive the same prediction pixel block from the predictor 1360 that the subtractor 1312 used in generating residual signals. The adder 1326 may add the prediction pixel block to reconstructed residual values output by the inverse transform unit 1324 and may output reconstructed pixel block data.

As described, the tile buffer 1330 may assemble a reconstructed tile from the output of the pixel block decoders 1320. The in-loop filter 1340 may perform various filtering operations on recovered pixel block data. For example, the in-loop filter 1340 may include a deblocking filter, a sample adaptive offset ("SAO") filter, and/or other types of in-loop filters (not shown).

The reference tile buffer 1350 may store filtered tile data for use in later predictions of other pixel blocks. Different types of prediction data are made available to the predictor 1360 for different prediction modes. For example, for an input pixel block, intra prediction takes a prediction reference from decoded data of the same tile in which the input pixel block is located. Thus, the reference tile buffer 1350 may store decoded pixel block data of each tile as it is coded. For the same input pixel block, inter prediction may take a prediction reference from previously coded and decoded tile(s) that are designated as reference tiles. Thus, the reference tile buffer 1350 may store these decoded reference tiles.

The controller 1370 may control overall operation of the coding system 1300. The controller 1370 may select operational parameters for the pixel block coder 1310 and the predictor 1360 based on analyses of input pixel blocks and also external constraints, such as coding bitrate targets and other operational parameters. As is relevant to the present discussion, when it selects quantization parameters $Q_P$, the use of uniform or non-uniform quantizers, and/or the transform mode M, it may provide those parameters to the syntax unit 1380, which may include data representing those parameters in the data stream of coded video data output by the system 1300. The controller 1370 also may select between different modes of operation by which the system may generate reference images and may include metadata identifying the modes selected for each portion of coded data.

During operation, the controller 1370 may revise operational parameters of the quantizer 1316 and the transform unit 1315 at different granularities of image data, either on a per pixel block basis or on a larger granularity (for example, per tile, per slice, per largest coding unit ("LCU") or Coding Tree Unit (CTU), or another region). In an aspect, the quantization parameters may be revised on a per-pixel basis within a coded tile.

Additionally, as discussed, the controller 1370 may control operation of the in-loop filter 1340 and the prediction unit 1360. Such control may include, for the prediction unit 1360, mode selection (lambda, modes to be tested, search windows, distortion strategies, etc.), and, for the in-loop filter 1340, selection of filter parameters, reordering parameters, weighted prediction, etc.

Figure 14:
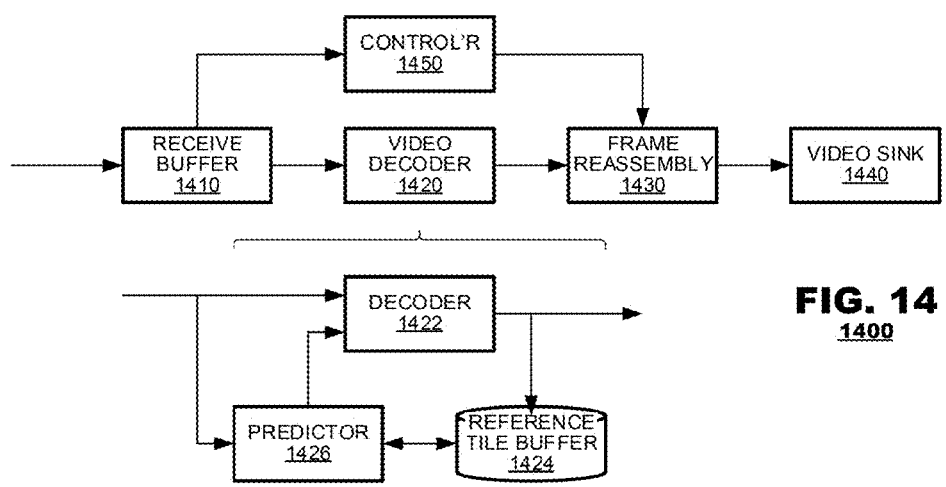
FIG. 14 is a functional block diagram of a decoding terminal according to an aspect of the present disclosure.

FIG. 14 is a simplified functional block diagram of a decoding terminal (FIG. 1) according to an aspect of the present disclosure. The decoding terminal may include a receive buffer 1410, a video coder 1420, a frame reassemble 1430, a video sink 1440, and a controller 1450. The receive buffer 1410 may receive coded data representing the video and may delivery the coded data to the video decoder 1420. Typically, coded data includes data representing other components of coded multimedia (for example, coded audio), and the receive buffer 1410 may forward other data to other units (not shown) assigned to process such data. The receive buffer 1410 also may provide tile metadata generated by an encoding terminal to the controller 1450.

The video decoder 1420 may invert coding processes applied by a coder (FIG. 2) to generate recovered tile data therefrom. The frame reassembler 1430 may generate frame data from the decoded tiles, and may output the tile data to the video sink 1440. The video sink 1440 may consume the decoded frame data. Typical video sinks 1440 include displays to render decoded frame(s), storage devices to store the decoded frames for later use, and computer applications that consume the video.

FIG. 14 illustrates operation of a video decoder 1420 in an aspect. The video decoder 1420 may include a decoder 1422, a reference tile buffer 1424, and a predictor 1426. The predictor 1426 may supply prediction data to the decoder 1422 as specified by the coded video data. The decoder 1422 may invert the differential coding processes applied by an encoder during coding. The decoder 1422 may output the decoded tile data. Decoded tiles designated as prediction references for later coding operations may be stored in the reference tile buffer.

The frame assembler 1430 may reassemble a composite frame from tiles output by the video decoder 1420. The frame assembler 1430 may arrange tile data according to location information contained in coded metadata. Thus, continuing with the example of FIG. 6, the frame assembler may generate a decoded frame from decode data of the tiles $T_1$-$T_n$ placed in spatial locations as identified by coding metadata. Moreover, for tiles (e.g., tile $T_n$) that spatially overlaps with other tiles, a frame assembler may blend data according to weights defined by an encoder either implicitly (e.g., by a default protocol) or explicitly (by signaling contained in the coded data).

Figure 15:
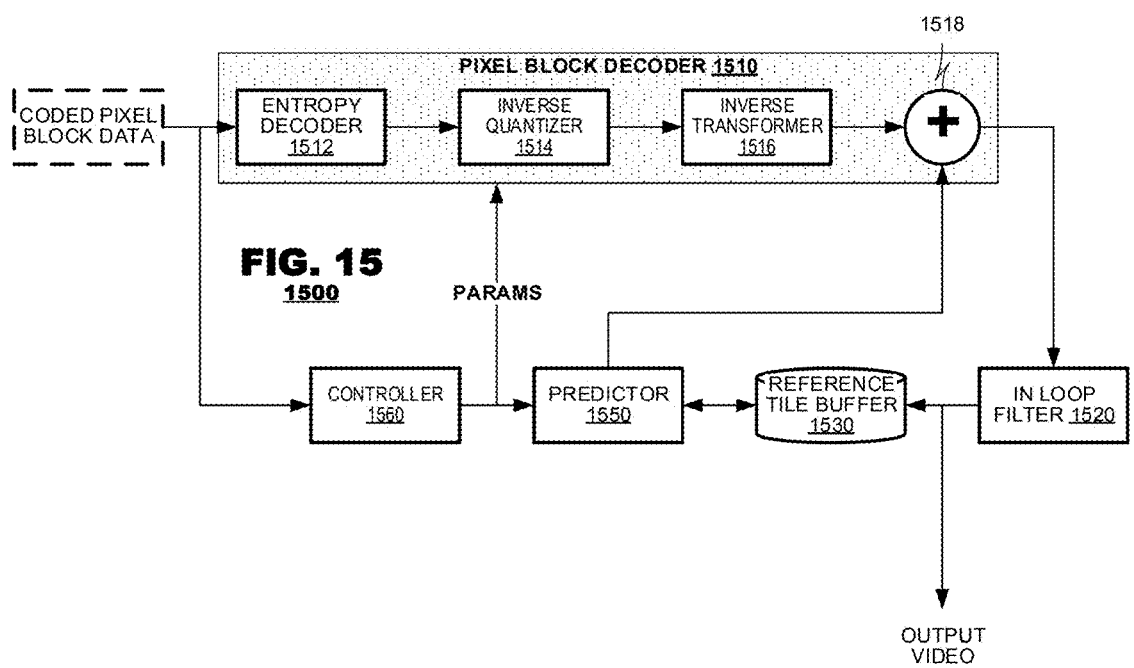
FIG. 15 is a block diagram of a video decoder according to an aspect of the present disclosure.

FIG. 15 is a functional block diagram of a decoding system 1500 according to an aspect of the present disclosure. The decoding system 1500 may include a pixel block decoder 1510, an in-loop filter 1520, a reference tile buffer 1530, a predictor 1550, and a controller 1560. The predictor 1550 may receive coding parameters of the coded pixel block from the controller 1560 and supply a prediction block retrieved from the reference tile buffer 1530 according to coding parameter data. The pixel block decoder 1510 may invert coding operations applied by the pixel block coder 1310 (FIG. 13). The in-loop filter 1520 may filter the reconstructed tile data. The filtered tiles may be output from the decoding system 700. Filtered tiles that are designated to serve as reference tiles also may be stored in the reference tile buffer 1530.

The pixel block decoder 1510 may include an entropy decoder 1512, an inverse quantizer 1514, an inverse transformer 1516, and an adder 1518. The entropy decoder 1512 may perform entropy decoding to invert processes performed by the entropy coder 1318 (FIG. 13). The inverse quantizer 1514 may invert operations of the quantizer 1316 of the pixel block coder 1310 (FIG. 13). Similarly, the inverse transformer 1516 may invert operations of the transformer 1314 (FIG. 13). They may use the quantization parameters $Q_P$ and transform modes M that are provided in the coded video data stream. Because quantization is likely to truncate data, the pixel blocks s' recovered by the inverse quantizer 1514, likely will possess coding errors when compared to the input pixel blocks presented to the pixel block coder 1310 of the encoder (FIG. 13).

The adder 1518 may invert operations performed by the subtractor 1310 (FIG. 13). It may receive a prediction pixel block from the predictor 1550 as determined by prediction references in the coded video data stream. The adder 1518 may add the prediction pixel block to reconstructed residual values output by the inverse transform unit 1516 and may output reconstructed pixel block data.

As described, the reference tile buffer 1530 may assemble a reconstructed tile from the output of the pixel block decoder 1510. The in-loop filter 1520 may perform various filtering operations on recovered pixel block data as identified by the coded video data. For example, the in-loop filter 1520 may include a deblocking filter, a sample adaptive offset ("SAO") filter, and/or other types of in-loop filters. In this manner, operation of the reference tile buffer 1530 and the in-loop filter 740 mimics operation of the counterpart tile buffer 1330 and in-loop filter 1340 of the encoder 1300 (FIG. 13).

The reference tile buffer 1530 may store filtered tile data for use in later prediction of other pixel blocks. The reference tile buffer 1530 may store decoded tiles as it is coded for use in intra prediction. The reference tile buffer 1530 also may store decoded reference tiles.

The controller 1560 may control overall operation of the coding system 700. The controller 1560 may set operational parameters for the pixel block decoder 1510 and the predictor 1550 based on parameters received in the coded video data stream. As is relevant to the present discussion, these operational parameters may include quantization parameters $Q_P$ for the dequantizer 1514 and transform modes M for the inverse transform unit 710. As discussed, the received parameters may be set at various granularities of image data, for example, on a per pixel block basis, a per tile basis, a per slice basis, a per LCU/CTU basis, or based on other types of regions defined for the input image.

The foregoing discussion has described operation of the aspects of the present disclosure in the context of video coders and decoders. Commonly, these components are provided as electronic devices. Video decoders and/or controllers can be embodied in integrated circuits, such as application specific integrated circuits, field programmable gate arrays, and/or digital signal processors. Alternatively, they can be embodied in computer programs that execute on camera devices, personal computers, notebook computers, tablet computers, smartphones, or computer servers. Such computer programs typically are stored in physical storage media such as electronic-, magnetic-, and/or optically-based storage devices, where they are read to a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

Video coders and decoders may exchange video through channels in a variety of ways. They may communicate with each other via communication and/or computer networks as illustrated in FIG. 1. In still other applications, video coders may output video data to storage devices, such as electrical, magnetic and/or optical storage media, which may be provided to decoders sometime later. In such applications, the decoders may retrieve the coded video data from the storage devices and decode it.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A video coding system, comprising:
   a partitioner having an input for a frame from a source video and an output for tiles generated from the frame, each tile having a common size,
   a predictive video coder having an input for the tiles and an output for coded tile data coded as a virtual video sequence, wherein the tiles of the frame are associated with different time stamps in the virtual video sequence, and the tiles corresponding to a first tile location over a plurality of frames of the video source are designated as a reference tile at a first frequency lower than tiles corresponding to a second tile location over the plurality of frames, and
   a transmitter, having an input for the coded tile data.

2. The system of claim 1, wherein the coded tile data contains data representing a spatial location of a tile within its frame.

3. The system of claim 1, wherein the partitioner recognizes a region of interest within the source video, and a size of the region of interest determines the common size of the tiles.

4. The system of claim 1, wherein the predictive video coder operates according to a standard coding protocol.

5. The system of claim 1, wherein tiles are persistent across multiple frames of the source video.

6. The system of claim 1, wherein the predictive video coder comprises:
   a video decoder having an input for coded tile data designated as reference tiles and an output for decoded tile data,
   a reference tile buffer to store the decoded tile data, and
   a predictor.

7. The system of claim 6, further comprising a controller, wherein
   a number of tiles is consistent across a plurality of frames of the video sequence, and
   the controller designates each persistence of a tile to serve as a candidate prediction reference at a rate determined by a predetermined policy.

8. The system of claim 1, further comprising a controller that
   estimates complexity of the tiles of the frame from the video source, and
   controls operations of the predictive video coder to coding the tiles in a coding order determined by the estimated complexity.

9. The system of coding system of claim 1, wherein the first frequency is based on an estimated rate of change of image content within the tiles corresponding to the first tile location.

10. A method of coding video data, comprising:
    partitioning individual frames of a video source into a plurality of tiles of common size;
    coding the frames from the video source according to a video coding protocol including assigning each tile of each frame from the video source its own timestamp according to the video coding protocol, and
    coding content of the tiles of the frames with motion compensation according to the video coding protocol having a respective temporal location corresponding to the tiles's respective timestamp and tiles corresponding to a first tile location over a plurality of frames of the video source are designated as a reference tile for the motion compensation at a first frequency lower than tiles corresponding to a second tile location over the plurality of frames; and
    outputting the coded tile data to a channel.

11. The method of claim 10, wherein the first frequency is selected based on a rate of change of image content at the first tile location over the plurality of frames.

* * * * *